3,075,957
CATALYTIC PROCESS
Gaetano F. D'Alelio, South Bend, Ind., assignor, by direct and mesne assignments, to Dal Mon Research Co., Cleveland, Ohio, a corporation of Delaware
No Drawing. Filed Apr. 21, 1958, Ser. No. 729,499
9 Claims. (Cl. 260—93.1)

This invention is concerned generally with the polymerization of olefins such as ethylene, propylene, butene-1, styrene, butadiene, isoprene, vinyl cyclohexene and the like olefins with a catalyst comprising the reaction product of (1) at least 1 metal halide of the formula $M(X)_n$ and (2) at least 1 organometal of the formula $M(R)_n$ wherein M is a metal selected from the class of Ti, Zr, V, Nb, Ta, Cr, Mo, W and Ce, X is a halogen, R represents a hydrocarbon group, $n$ is a numerical value greater than 2 and corresponds to the valency of the metal in the compound.

The metal halides, $M(X)_n$, for example, titanium and zirconium tetrachlorides are known as Friedel-Crafts catalysts and similarly to $AlCl_3$, they are not effective in converting ethylene to high molecular weight solid polymers. The Friedel-Crafts catalysts are less effective in converting such olefins as propylene, butene-1, hexene-1, vinyl cyclohexene, vinyl cyclohexane, etc. to high molecular weight solid polymers or butadiene, isoprene, pentadiene-1,3 etc., to high molecular weight, useful rubbery polymers. It is likewise known that organometal compounds of the formula, $M(R)_n$ of the type described hereinabove, are not considered to be effective polyolefin catalysts, since no polyethylene is obtained when $(C_5H_5)_2Ti(C_6H_5)_2$ is used as a catalyst in attempts to polymerize ethylene [Journal Polymer Science, XVI, No. 112, 120 (1957)]. Compounds of the class $M(R)_n$ are disclosed generally in British Patent 778,639 as being suitable polymerization catalysts when used with an alkali-metal-tetrahydrocarbon compound, a lithium hydrocarbon compound, a tin tetraalkyl compound or a cadmium alkyl to reduce the element present to a valency of 2. The activity of these catalysts (British Patent 778,639) is not greatly different from those of the structure $M(R)_n$ since little or no reduction of the metal, (M), occurs. However, my invention differs from the British invention in that I do not start with the metal in a valency of 2, nor do I necessarily use a reducing agent, since I may use a metal halide, such as titanium or zirconium tetrachloride, which are not reducing agents. It is surprising, therefore, that a mixture of a metal halide, $M(X)_n$ and the organometals $M(R)_n$ of this invention should be active polyolefin catalysts. It is further surprising that these catalysts are capable of polymerizing an olefin, such as ethylene, to high density, high molecular weight polyethylene and of producing linear polymers from monoolefins and polyolefins, and of producing copolymers from mixtures of olefins.

The nature of the catalysts of this invention, obtained by reacting the metal halide, $M(X)_n$, with the organometal is not known at present and they appear to be complex reaction products. The metal halide used may be the metal chloride, the bromide, the fluoride or the iodide or mixed halides or mixture of these halides, but for economic reasons, the chlorides are preferred.

The organometal compounds, $M(R)_n$, used in the practice of this invention are prepared by the usual methods regularly used to prepare such compounds. The general method consists in replacing the halogens in a halogen compound of the metal by an organic radical in a step-wise reaction until the halogen atoms are substituted. The general reaction is illustrated with titanium tetrachloride in its reaction with Grignard reagents or other organometals such as alkyl sodium, alkyl potassium, alkyl lithium or an aryl sodium or lithium, etc. [Chemistry and Industry, 307 (1954); J.A.C.S., 75, 1011 (1953); J.A.C.S., 73, 3877 (1951); J.A.C.S., 75, 3882 (1953); J.A.C.S., 76, 2278 (1954); J.A.C.S., 76, 4281 (1954).] It is possible, by step-wise substitution, to produce the organometal compounds used in this invention, which have more than one type of hydrocarbon attached to the metal atom, for example,

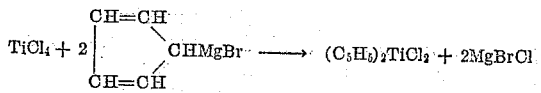

or

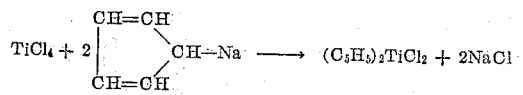

then

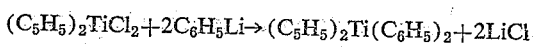

By using a trialkyl metal halide, for example, $(C_4H_9)_3TiCl$ [B.P. 154–155° C./2 mm., J. App. Chem., p. 250 (1952)], tetrasubstituted organometal compounds, such as

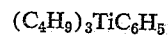

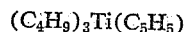

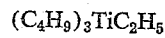

are readily prepared by substitution reactions. Likewise, by using a dialkyl titanium dihalide, e.g., $(C_4H_9)_2TiCl_2$ [J. Chem. Soc., p. 2773 (1952)], dialkyl titanium compounds with 2 or other different hydrocarbon groups may be prepared, e.g.,

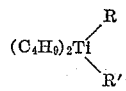

Also, by using a monoalkyl titanium trihalide, an alkyl titanium with 3 other hydrocarbon groups may be prepared, e.g., $(C_4H_9)(C_3H_7)Ti(C_2H_5)(CH_3)$, etc. Also, the hydrocarbon groups attached to the metal atom may be the same, as for example, $(C_4H_9)_4Ti$; (B.P. 189°/16 mm.). Some other intermediates suitable for the preparation of the organometals used in the practice of this invention, in which the R groups may be the same or different are $R_3ZrX$, $R_2ZrX_2$, $RZrX_3$, $R_3VX$, $R_2VX_2$, $RVX_3$, $R_2NbX_2$, $R_2TaX_2$, $R_3TaX$, $R_3MoX$, $R_2MoX_2$, $R_2MoX_3$, $R_3WX$, $R_2WX_2$, $R_2WX_3$, etc., in which R is a hydrocarbon and X is a halogen [J.A.C.S., 75, 4281 (1954)].

The R group in the organometal compound may be an aliphatic hydrocarbon radical such as methyl, ethyl, propyl, butyl, amyl, octyl, dodecyl, allyl, pentenyl-1, pentenyl-2, pentenyl-3, undecanyl-1, dodecenyl-2, etc. or a cycloaliphatic group such as cyclohexanyl, cyclopentanyl, cyclobutanyl, cyclobutenyl, cyclohexenyl, alkylcyclohexanyl, alkylcyclohexenyl, arylcyclohexenyl, cyclopentadienyl, alkylcyclopentadienyl, etc., or an aralkyl radical such as benzyl, 2-phenylethyl, 1-phenylethyl, phenylpropyl, naphthylethyl, phenylethenyl, etc., or the aromatic and alkyl aromatic radicals such as phenyl, tolyl, xylyl, carbazole, naphthyl, methylnaphthyl, diphenyl, terphenyl, etc. Radical groups represented by R which contain less than about 12 carbon atoms in each R group are preferred because of availability and economy. The alkylmetal compounds, $M(R)_n$, have low stability to air, oxygen and water, whereas the cyclopentadienyl compounds and the aryl compounds show greater stability but all of them should be processed or handled in an inert atmosphere such as in nitrogen or in an inert gas, or in an inert solvent protected with an inert atmosphere, or transferred from one step or operation to another without exposing them to contamination. In many cases, these organometals may be used without isolation from the solvent or medium in which they have been prepared.

Metal compounds represented by the structure, $M(X)_n$, are $TiX_n$, $ZrX_n$, $VX_n$, $NbX_n$, $TaX_n$, $CrX_n$, $MoX_n$, $WX_n$, and $CeX_n$ for example, titanium tetrachloride, titanium trichloride, titanium tetrabromide, titanium tribromide, titanium tetrafluoride, zirconium tetrachloride, zirconium trichloride, zirconium tetrabromide, vanadium tetrachloride, vanadium trichloride, vanadium pentafluoride, niobium pentachloride, niobium pentabromide, niobium pentafluoride, tantalum pentachloride, tantalum pentabromide, chromium trichloride, chromium trifluoride, molybdenum trichloride, molybdenum tetrachloride, molybdenum pentachloride, molybdenum tribromide, molybdenum tetrabromide, molybdenum hexafluoride, tungsten pentabromide, tungsten pentabromide, tungsten pentachloride, tungsten hexachloride, tungsten hexafluoride, cerium tribromide, cerium trichloride, cerium trifluoride, cerium tetrafluoride, etc.

The catalysts used in the practice of this invention may be prepared simply by mixing the organometal or a mixture of organometals with a metal halide or mixture of halides, but preferably they are mixed in the presence of an inert solvent or medium such as the hydrocarbons, for example, hexane, heptane, benzene, toluene, cyclohexane, or mixtures of hydrocarbons, and, in some cases, ethers, such as diethyl ether, tetrahydrofurane and the like may be used alone or in conjunction with a hydrocarbon or a halogenated hydrocarbon, as for example, chlorobenzene. After mixing of the organometal $M(R)_n$ and the metal halide, $M(X)_n$, the catalyst may be used as such or the mixture may be heated to the boiling point of the solvent at subatmospheric, atmospheric, or superatmospheric pressure, or, if the organometal and the metal halide are added to a suitable reactor, they may be added at room temperature or below room temperature and heat applied to the reactor before or during the addition of the olefin.

In the preparation of the catalyst of this invention from the organometal $M(R)_n$ and the metal halide, $M(X)_n$, the metal M in the organometal and the metal halide may be the same or different metal atoms, as for example, when the atoms are the same, the components are: $Ti(R)_n$ and $Ti(X)_n$; $Zr(R)_n$ and $Zr(X)_n$; $V(R)_n$ and $V(X)_n$; $Nb(R)_n$ and $Nb(X)_n$; $Ta(R)_n$ and $Ta(X)_n$; $Mo(R)_n$ and $Mo(X)_n$; $W(R)_n$ and $W(X)_n$; $Ce(R)_n$ and $Ce(X)_n$; and when the atoms are different the atomic weight of the metal M in the organometal $M(R)_n$ may be greater than in the metal halide $M(X)_n$, as for example, $Zr(R)_n$ and $Ti(X)_n$; $V(R)_n$ and $Ti(X)_n$; $Cr(R)_n$ and $V(X)_n$; $Mo(R)_n$ and $Zr(X)_n$; $W(R)_n$ and $Mo(X)_n$; $Ce(R)_n$ and $Ta(X)_n$; or the metal M in the organometal may be of lower atomic weight than in the metal halide, $M(X)_n$, for example, $Ti(R)_n$ and $V(X)_n$; $V(R)_n$ and $Cr(X)_n$; $Ti(R)_n$ and $Zn(X)_n$; $Zr(R)_n$ and $Mo(X)_n$; $Mo(R)_n$ and $W(X)_n$; etc. The preferred embodiment of this invention encompasses the use of the organometal $M(R)_n$ wherein the atomic weight of M is smaller than the metal in the halide $M(X)_n$.

The ratio of the organometal to the metal halide that may be used in the preparation of the catalysts of this invention is not critical and may be from 1 part organometal to 100 or more parts metal halide to 100 parts organometal to 1 or less part metal halide. Satisfactory results are obtained in a range of from 1 part organometal to 10 parts metal halide to 10 parts organometal to 1 part metal halide. It has also been found that the nature of the catalyst resulting from the ratio of the organometal to the metal halide, for example, titanium tetrachloride, determines to some extent the nature of the polymer. If large amounts of metal halide, for example, titanium tetrachloride are used, or if the reaction between the organometal and the metal halide is incomplete so that there remains an excess of the metal halide, lower molecular weight polymers are obtained than if lesser amounts of metal halide is present. The ratio of the organometal to the metal halide may be used to control the molecular weight of the polymer or copolymer desired.

As a polymerization medium susbtantially any inert material may be used which is liquid under the conditions of the temperature employed in the polymerization. Hydrocarbon solvents are preferred and are preferably free substantially of materials that react with the catalysts such as $O_2$, $H_2O$, alcohols, ketones, and the like. Suitable solvents include pentane, hexane, cyclohexane, octane, benzene, toluene, xylene, chlorobenzene, and the like. In some cases, the polymerization may be carried out in the absence of a liquid medium. In other cases, the monomer or mixtures of monomers themselves, if liquid, may be used as the polymerization medium, such as styrene, isoprene, 2,3-dimethyl butadiene, vinyl cyclohexane, vinyl cyclohexene, and the like. The amount of catalyst may be varied over a wide range. Relatively small amounts are operable to form relatively large amounts of polymer. In general, a practical range is 0.0001 to 0.1 part of catalyst per part of olefin polymerized. Even larger amounts of catalyst are operable but large amounts are uneconomical and make the polymer more difficult to purify. When low molecular weight polymers are obtained by the process of this invention, they are useful as chemical intermediates in alkylation, epoxidation, chlorination, sulfonation, etc., and as plasticizers for the solid polymers produced by the procedures described herein. The catalysts as prepared in the practice of this invention are useful in polymerizing olefins at temperatures ranging from below or about room temperature to temperatures of 200° C. or even higher and at pressures ranging from atmospheric or a few atmospheres to pressures as high as 10,000 p.s.i. or higher. For practical operations, temperatures in the range of 20–200° C. and pressures of 100–2000 p.s.i. are suitable. The following examples illustrate without limiting the invention.

*Example I*

Three and three-tenth (3.3) grams of $(C_6H_5)_2Ti(C_5H_5)_2$ and 1.6 grams of titanium tetrachloride are added to 100 ml. of toluene in a stainless steel reactor equipped with stirrer, inlet port, heating means, etc. The transfer of the catalyst components to the reactor is made in an inert atmosphere to avoid contamination with moisture and oxygen. The reactor is then heated to 125–150° C. and pressured with ethylene to 500–700 p.s.i. Ethylene is rapidly absorbed and the reactor is repressured from time to time to replace the ethylene consumed. After 6 hours, even though the system is still absorbing ethylene, the run is terminated, the autoclave cooled, vented, opened, and the crude, solid polyethylene transferred to a container containing about 200 ml. of methanol acidified with HCl and refluxed for 1 hour. The purified solid white polyethylene is then separated by filtration and dried. The yield is about 120 grams.

Similar results are obtained when other organometal compounds such as $(C_4H_9)_4Ti$,  $Zr(C_4H_9)_4$, $C_2H_5$—$Zr(C_4H_9)_3$ or compounds of the formula $M(R)_n$, as described hereinabove are used instead of $(C_6H_5)_2Ti(C_5H_5)_2$. Likewise titanium tetrafluoride, titanium tetrabromide, titanium tetraiodide may be used in place of titanium tetrachloride, as may titanium trichloride, zirconium tetrachloride, vanadium trichloride, molybdenum trichloride, molybdenum trifluoride, tungsten pentachloride, etc. Substitution of the ethylene by other olefins, such as $CH_2=CHCH_3$, $$CH_2=CH-CH_2CH_3$$
$$CH_2=CHC_6H_{11}, CH_2=CHC_6H_5$$
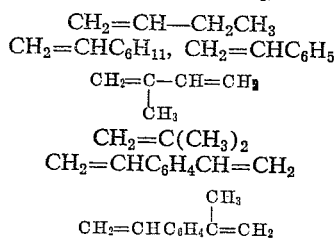
$$CH_2=C(CH_3)_2$$
$$CH_2=CHC_6H_4CH=CH_2$$
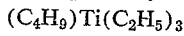

etc., produces the corresponding polymer.

Example II

Two and eight-tenths (2.8) grams of $(C_4H_9)_4Ti$ and 1.3 grams of $MoCl_3$ in 200 ml. heptane are refluxed for 2 hours in an inert atmosphere in a 1-liter reactor equipped with stirrer, heating and cooling means. Propylene is added to the reaction flask continuously over a period of 5 hours and 92 grams of solid polypropylene is isolated. When butene-1, styrene, vinyl cyclohexane and vinyl cyclohexene are substituted for the propylene, the corresponding polymer is obtained. Active polymerization catalysts may also be prepared by using $$(C_4H_9)Ti(C_2H_5)_3$$

or $(C_4H_9)_2Ti(C_2H_5)_2$, $(C_4H_9)_3TiC_2H_5$ or the corresponding zirconium derivatives instead of $(C_4H_9)_4Ti$ of this example. Similarly the other $M(R)_n$ and $M(X)_n$ compounds may be substituted for the organometals and metal halides of this example.

Example III

The procedure of Example II, using $VCl_3$ instead of $MoCl_3$ is repeated to produce copolymers from mixtures of olefins containing at least two monomers such as 10–90 parts of ethylene to 90–10 parts propylene; 5–95 parts styrene to 95–5 parts vinyl cyclohexane; 2–98 parts propylene to 98–2 parts isoprene, etc.; tripolymers such as those of (1) styrene, vinyl cyclohexane and cyclohexene; (2) propylene, butadiene and isoprene; (3) divinyl benzene, styrene and hexene-1, etc., in which the monomer concentrations may be varied over wide ratios may also be prepared by the use of the catalyst of this example. Similar results may be obtained when other $M(R)_n$ and $M(X)_n$ compounds are used instead of the $(C_4H_9)_4Ti$ and $VCl_3$ of this example.

Example IV

To the catalysts of Example II, 50 grams of liquid isoprene is added slowly over a period of 2 hours and the mixture is heated to 50° C. for 3 hours, after which it is cooled and the product added to 1 liter of methanol to precipitate the polymer. Two grams of phenyl-β-naphthyl amine is added to the polymer which is then washed with water and dried. Thirty parts of this polymer are compounded with 1 part of zinc oxide, 1 part of stearic acid, 0.2 part of mercaptobenzothiazole and 0.75 part of sulfur and vulcanized at 270° F. for 25 minutes to produce a vulcanized product with properties similar to those of vulcanized natural rubber. Butadiene, phenylbutadiene, 2,3-dimethylbutadiene, etc., may be used alone or in combinations with other dienes, trienes and monoolefins to produce vulcanizable compositions containing reactive residual double bonds in the polymer.

Example V

Twenty-five parts of a commercial divinyl benzene containing approximately 50 percent of divinyl benzene and 50 percent of ethyl styrene are added slowly at 50° C. and with stirring to 100 parts of toluene containing the catalyst of Example III. The reaction is performed in a suitable reactor, equipped with a stirrer, and maintained in an inert atmosphere. Upon completion of the addition of the divinyl benzene mixture, the reaction is continued for 5 hours, after which it is cooled and added to 1 liter of methanol acidified with HCl. The polymer is isolated by filtration, dried in a vacuum dessicator and stored under nitrogen. About 20 parts of polymer are obtained which contains unsaturation corresponding to a copolymer of this structure,

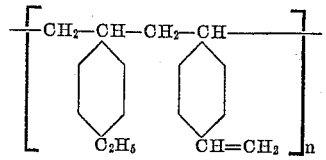

On heating, the polymer converts, especially in the presence of air to an insoluble, infusible polymer. In the presence of a catalyst, as for example, the percatalysts such as benzoyl peroxide, a catalytic conversion to the insoluble, infusible, state is obtained rapidly.

Example VI

Substitution of $(C_5H_5)_2V(C_4H_9)_2$ and $WCl_5$ for the catalysts of Examples I, II, III, IV and V results in active polymerization catalysts.

Example VII $(C_5H_5)_2TaC_2H_5$ and $(C_5H_5)_2NbC_2H_5$ are substituted for the $(C_5H_5)_2V(C_4H_9)_2$ of Example VI to produce active polymerization catalysts.

The catalysts of this invention are useful in polymerizing olefins having a $CH_2=C<$ group, and include such monomers as hexatriene; hexadiene-1,5; pentadiene-1,3; allene, diallyl; dimethallyl; 2,4,4,-trimethyl pentene-1; methyl pentadiene-1,3, etc., as well as mixtures containing cyclopentadiene, myrcene, alpha methyl styrene, etc.

I claim:

1. The process of polymerizing at a temperature in the range of 20–200° C. an olefin having no more than 11 carbon atoms and having a terminal ethylenic group, in an inert medium with a catalyst comprising the reaction product of (1) a vanadium chloride and (2) at least one organometal compound of the formula $Ti(R)_n$ wherein R is a hydrocarbon radical having no more than 12 carbon atoms therein and $n$ is a numerical value greater than 2 and corresponding to the valency of Ti.

2. The process of claim 1 in which said vanadium chloride is vanadium trichloride and said organometal compound is tetrabutyl titanium.

3. The process of claim 1 in which said vanadium chloride is vanadium trichloride and said organometal compound is dibutyl diethyl titanium.

4. The process of claim 1 in which said vanadium chloride is vanadium trichloride and said organometal compound is ethyltributyl titanium.

5. The process of claim 1 in which said olefin is propylene.

6. The process of claim 1 in which said olefin is styrene.

7. The process of claim 1 in which said olefin is butene-1.

8. The process of claim 1 in which said olefin is vinyl cyclohexene.

9. The process of claim 1 in which said olefin is divinyl benzene.

References Cited in the file of this patent

UNITED STATES PATENTS

| | | |
|---|---|---|
| 2,440,498 | Young et al. | Apr. 27, 1948 |
| 2,491,116 | Kraus et al. | Dec. 13, 1949 |
| 2,827,445 | Bartolomeo et al. | Mar. 18, 1958 |
| 2,880,199 | Jezl | Mar. 31, 1959 |
| 2,910,461 | Nowlin et al. | Oct. 27, 1959 |
| 2,948,711 | Kennedy | Aug. 9, 1960 |
| 2,953,531 | Anderson et al. | Sept. 20, 1960 |

FOREIGN PATENTS

| | | |
|---|---|---|
| 778,639 | Great Britain | July 10, 1957 |